(12) United States Patent
Fishman et al.

(10) Patent No.: US 7,668,900 B2
(45) Date of Patent: Feb. 23, 2010

(54) SYSTEM AND METHOD FOR SCHEDULING AN EVENT OVER A NETWORK

(75) Inventors: Daniel Fishman, Newtonville, MA (US); Charles Connelly, Brighton, MA (US); Jorge Borges, Newton, MA (US); Jorges Sanchez, Brighton, MA (US)

(73) Assignee: ACCESS Systems Americas, Inc., Sunnyvale, CA (US)

( * ) Notice: Subject to any disclaimer, the term of this patent is extended or adjusted under 35 U.S.C. 154(b) by 887 days.

(21) Appl. No.: 09/872,164

(22) Filed: May 31, 2001

(65) Prior Publication Data

US 2002/0184321 A1    Dec. 5, 2002

(51) Int. Cl.
  G06F 15/16       (2006.01)
(52) U.S. Cl. .............. 709/203; 705/9; 707/104
(58) Field of Classification Search ......... 709/318, 709/300, 301, 302, 206, 103, 203; 715/25; 707/350, 104; 705/9
See application file for complete search history.

(56) References Cited

U.S. PATENT DOCUMENTS

| | | | | |
|---|---|---|---|---|
| 4,977,520 A * | 12/1990 | McGaughey et al. | ........ | 715/753 |
| 5,124,912 A * | 6/1992 | Hotaling et al. | ................. | 705/9 |
| 5,303,145 A * | 4/1994 | Griffin et al. | .................. | 705/9 |
| 5,727,202 A | 3/1998 | Kucala | ........................ | 395/610 |
| 5,774,867 A | 6/1998 | Fitzpatrick et al. | ............. | 705/8 |
| 5,790,974 A * | 8/1998 | Tognazzini | .............. | 455/456.5 |
| 5,960,406 A * | 9/1999 | Rasansky et al. | ................ | 705/9 |
| 5,963,913 A * | 10/1999 | Henneuse et al. | ............... | 705/9 |
| 6,000,000 A | 12/1999 | Hawkins et al. | ............. | 707/201 |
| 6,016,478 A * | 1/2000 | Zhang et al. | ................... | 705/9 |
| 6,064,977 A * | 5/2000 | Haverstock et al. | ............ | 705/9 |
| 6,101,480 A | 8/2000 | Conmy et al. | ................... | 705/9 |
| 6,216,110 B1 | 4/2001 | Silverberg | ...................... | 705/9 |
| 6,226,693 B1 * | 5/2001 | Chow et al. | ................... | 719/318 |
| 6,269,341 B1 | 7/2001 | Redcay, Jr. | ..................... | 705/8 |
| 6,313,852 B1 | 11/2001 | Ishizaki et al. | .............. | 345/751 |
| 6,339,795 B1 | 1/2002 | Narurkar et al. | ............ | 709/246 |
| 6,363,352 B1 * | 3/2002 | Dailey et al. | ................... | 705/9 |
| 6,366,915 B1 | 4/2002 | Rubert et al. | ................. | 707/10 |
| 6,369,840 B1 * | 4/2002 | Barnett et al. | ............... | 715/853 |
| 6,405,225 B1 | 6/2002 | Apfel et al. | .................. | 707/526 |
| 6,577,622 B1 | 6/2003 | Schuster et al. | ............. | 370/352 |
| 6,647,370 B1 | 11/2003 | Fu et al. | ........................ | 705/8 |
| 6,654,800 B1 | 11/2003 | Rieger, III | .................. | 709/223 |
| 6,675,356 B1 | 1/2004 | Adler et al. | .................. | 715/530 |
| 7,082,402 B2 * | 7/2006 | Conmy et al. | .................. | 705/8 |
| 2001/0014867 A1 * | 8/2001 | Conmy | .......................... | 705/9 |
| 2002/0032589 A1 * | 3/2002 | Shah | ............................. | 705/6 |
| 2002/0032592 A1 * | 3/2002 | Krasnick et al. | ............... | 705/8 |

* cited by examiner

*Primary Examiner*—Vivek Srivastava
*Assistant Examiner*—Adnan Mirza
(74) *Attorney, Agent, or Firm*—Sunstein Kahn Murphy & Timbers LLP

(57) ABSTRACT

A method for scheduling an event over a network in a calendar of an invitee includes creating a schedule request that includes at least a set of details of the event and an identifier if the event creator. The schedule request is sent to a server in communication with the network. The server has access to the calendar of the invitee and a calendar for the event creator. Upon receipt of the schedule request, an event record is created at the server that includes at least the set of details for the event and a link to the invitee's calendar. The event is also added to the calendar of the invitee. The schedule request may be created using a link associated with the event.

16 Claims, 6 Drawing Sheets

FIG. 3

BOSTON UNIVERSITY
www.gobu.com

Terriers | TotalCast™ | Ticket Info | Schedule | Staff

*Men's Track Indoor/Outdoor*

2000-01 Men's Indoor Track & Field Schedule

| Date | Teams | | Location |
|---|---|---|---|
| Dec.2 | Maine,UNH,UMass/Amherst, Providence,Central Connecticut, Bentley | @ Results | |
| Dec.9 | Northeastern,Bentley,U.of Albany, Yale,Central Connecticut | @ | B.U.Armory |
| Jan.19 | Terrier Cup Challenge New England Challenge Cup | @ | B.U.Armory |
| Jan.26-27 | Terrier Classic | @ | B.U.Armory |
| Feb.10 | St. Valentine Invitational | @ | B.U.Armory |
| Feb.17 | America East Championship | @ | B.U.Armory |
| Feb.23-24 | New England Championship | @ | B.U.Armory |
| March 3-4 | IC-4A Championship | @ | Reggie Lewis Center-Boston |
| March 9-10 | NCAA Championship | @ | Fayetteville,AR |

Men's Sports
- Basketball
- Crew
- Cross Country
- Golf
- Ice Hockey
- Soccer
- Swimming
- Tennis
- Track Indoor/Outdoor
- Wrestling Women's Sports
- Basketball
- Crew
- Cross Country
- Field Hockey
- Golf
- Lacrosse
- Soccer
- Swimming
- Track Indoor/Outdoor
- Tennis Links
- BUAA/Team Behind the Teams
- About the Athletic Department
- Facilities
- Promotions/ ated with the event. The schedule request may be a hypertext
SYSTEM AND METHOD FOR SCHEDULING AN EVENT OVER A NETWORK

TECHNICAL FIELD

The present invention relates to systems and methods for information management, in particular, scheduling an event over a network, such as the Internet, in a calendar application, such as a personal information management system.

BACKGROUND ART

Personal information managers ("PIMs") are well known in the prior art. PIMs are software applications that are designed to help users organize information such as, for example, calendars or schedules, dates, lists, reminders and contacts and may be implemented on a personal computer or on a personal digital assistant ("PDA"). In addition, PIM's may be implemented as Web sites on the World Wide Web.

SUMMARY OF THE INVENTION

In accordance with one aspect of the invention, a method of scheduling an event over a network in a calendar of an invitee, the event having a set of details provided by an event creator, includes creating a schedule request including at least the set of details and an identifier for the event creator. The schedule request is sent to a server in communication with the network and having access to the calendar of the invitee and a calendar for the event creator. An event record is created at the server that includes at least the set of details and a link to the invitee's calendar. The event is also added to the calendar of the invitee.

In one embodiment, the method further includes creating a link from the event creator's calendar and adding the event to the event creator's calendar. The network may be the Internet. The invitee's calendar, the event creator's calendar and the event record may be stored in a database in communication with the server. The schedule request may be a hypertext transfer protocol request and the invitee's calendar may be part of a personal information management system. In another embodiment, where the event creator changes at least one member of the set of details, the method further includes updating the event record with the changed set of details and updating the event in the invitee's calendar with the changed set of details using the link between event record and the invitee's calendar. A notification message may be sent to the invitee including the changed set of details. In a further embodiment, the schedule request is created using a link associated with the event.

In accordance with another aspect of the invention, a system for scheduling an event over a network in a calendar of an invitee, the event having a set of details provided by an event creator, includes a first link, inserted in a content site associated with the event creator and including the event. When the link is selected, it creates a schedule request including at least the set of details for the event and an identifier of the event creator. At least one server, in communication with the network, receives the schedule request and stores the event in the invitee's calendar and in an event record that includes a second link to the invitee's calendar. At least one database, in communication with the server stores the event record.

In one embodiment, the schedule request is a hypertext transfer protocol request. The event may also be stored in a calendar for the event creator. In another embodiment, the content site is a Web page on the World Wide Web.

Further embodiments of the invention are implemented as a computer program product having a computer useable medium with computer readable program code therein. The computer readable program code may be read and utilized by the computer system in accordance with conventional processes.

BRIEF DESCRIPTION OF THE DRAWINGS

The foregoing features of the invention will be more readily understood by reference to the following detailed description, taken with reference to the accompanying drawings, in which:

FIG. 3 shows an exemplary content site including a schedule link in accordance with an embodiment of the invention.

DETAILED DESCRIPTION OF SPECIFIC EMBODIMENTS

Definitions. As used in this description and the accompanying claims, the following terms shall have the meanings indicated, unless the context otherwise requires:

"Invitee" means a user that has selected and scheduled an event in a calendar.

Figure 1:
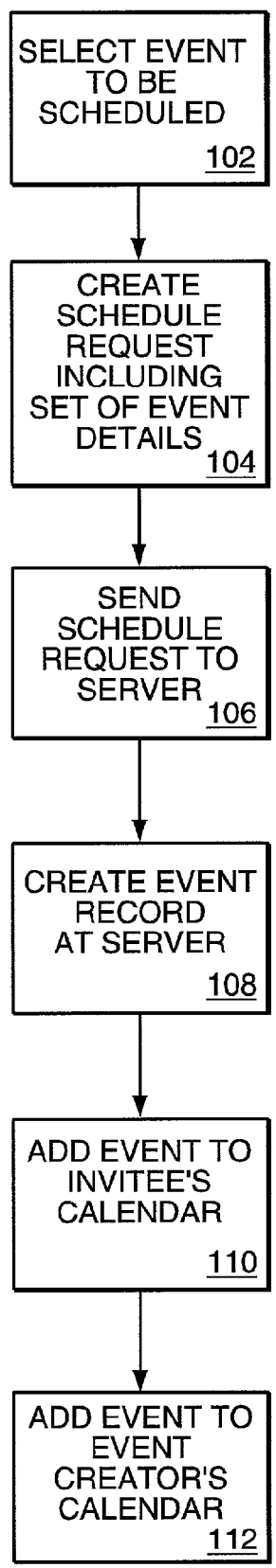
FIG. 1 is a block diagram of the logical flow of a method of scheduling an event over a network in accordance with an embodiment of the invention.

FIG. 1 is a block diagram of the logical flow of a method for scheduling an event over a network in accordance with an embodiment of the invention. At block 102, a user, otherwise referred to herein as an invitee, selects an event to be scheduled in a calendar associated with the user. The user may be, for example, searching for information on the Internet, in particular, the World Wide Web. A plurality of content providers, otherwise referred to herein as an event creator, provide Web sites on the World Wide Web that include event information. An invitee may locate, display and interact with information on the World Wide Web using a Web browser. In accordance with an embodiment of the invention, an event creator provides a link for each event on the Web site. The invitee may then select a link and therefore select the event to be scheduled in the invitee's calendar. The invitee's calendar may be part of, for example, a personal information management system ("PIM"). For more information regarding a Web-based PIM, see co-pending patent application Ser. No. 09/498,516, filed Feb. 2, 2000, and co-pending patent application Ser. No. 09/693,543, filed Oct. 20, 2000, which applications are herein incorporated by reference.

At block 104, when the invitee selects the link associated with a particular event, a schedule request is created that includes a set of details for the event. The schedule request may be, for example, an HTTP (hypertext transfer protocol) request that includes the set of details for the event. The set of details includes information such as date, time, location, etc. for the event. The schedule request may also include an identifier of the event and an identifier of the event creator. In order to create the schedule request, the event details are parsed using parsing methods known in the art.

At block 106, the schedule request including the set of details is sent to a server that has access to the invitee's calendar and its calendar data as well as a calendar and calendar data for the event creator. Preferably, the calendars and calendar data may be stored in a database in communication with the server. As mentioned above, the invitee's calendar and the event creator's calendar may be part of, for example, a personal information management system.

When the schedule request is sent to the server, the server will need to access the invitee's calendar and calendar data. If the invitee is registered with the system associated with the invitee's calendar, a cookie may be created by the Web browser so that the browser may login to the system without requiring any action by the invitee. A cookie is a mechanism known in the art that allows the Web browser to store information about the user. If the Web browser does not have a cookie with the invitee's login information, the invitee will be presented with a request for login information. Once the invitee provides the requested login information, the server may access the invitee's calendar and calendar data. While the event is scheduled in the invitee's calendar, the invitee will advantageously remain at the location on the Web where the event information was found and may continue searching the Web. If the invitee is not registered with the system, the invitee will be presented with a request to register. When the invitee has registered with the system, a calendar will automatically be created for the invitee and stored in the database. The event creator identifier that is included in the schedule request may be used to identify the event creator and to access the calendar and calendar data for the event creator.

Once the server receives the schedule request, the server will use the event identifier and the event creator identifier to determine if the event is new or has been scheduled before by another invitee. If the event is new (i.e, an event record does not exist), an event record is created for the event at block 108. The set of details for the event are stored in the event record as well as the event identifier and the event creator identifier. The event record may also be stored in a database in communication with the server. At block 110 and 112, a reference to the event is added to the invitee's calendar as well as the event creator's calendar. When the invitee accesses their calendar, they may view the reference to the event that may include information such as the date, time and location of the event. In addition, a link is created from the invitee's calendar to the event record. A link is also created between the event creator's calendar and the event record.

If the event has been scheduled before, then an event record should already exist for the event. The server compares the set of details in the schedule request to the set of details in the event record to determine if the set of details are the same or if a change has been made. If a change to the details of the event has been made, the event record will be updated as well as the calendar of any invitee that had previously scheduled the event prior to the change. The invitees may also be notified of the change using a notification method as discussed below.

The event creator may edit or delete the set of details for the event after an invitee has scheduled the event. Generally, the event creator may edit the event by accessing their calendar as well as changing the event details on the Web site (as discussed above). When a change is made to the event by the event creator at their calendar, the event record is updated as well as the calendar view of each invitee that has scheduled the event and therefore has a calendar with a link to the event record. In this manner, each invitee is notified of any changes to the event without having to reschedule or monitor the status of the event. When an invitee accesses their calendar, the new details of the event may be viewed. In one embodiment, a notification message may also be sent to each invitee including the changes made to the event. The notification message may be an E-mail sent via the Internet.

If the event creator cancels or deletes the event, the link from the event creator's calendar to the event record is deleted and the reference to the event in the event creator's calendar is deleted. A notification message of the cancellation may be sent to each invitee and the link to the event record from each invitee's calendar is removed. The reference to the event in the display of the invitee's calendar is also deleted.

Each invitee may also choose to delete the event from such invitee's calendar, although the event may not be canceled by such invitee for other invitees or the event creator. In this instance, the link from the calendar of the canceling invitee to the event record is deleted while the event record remains.

Once the event has been added to the invitee's calendar, a response may be sent from the server to the Web browser used by the invitee to indicate that the event has been added. For example, a light may appear, or an additional window may appear to indicate a successful addition of the event.

In a further embodiment, an invitee may add the event to a handheld device such as a personal digital assistant (PDA) or cellular telephone. In one embodiment, the handheld device may be a PDA such as the Palm m505 or Palm VIIx provided by Palm, Inc. of Santa Clara, Calif. The invitee's calendar data stored in the database at the server may be added to calendar data on a PDA using synchronization methods known in the art. The PDA may synchronize with the calendar and contact data using a wired connection or through wireless communication for a wireless device.

Figure 2:
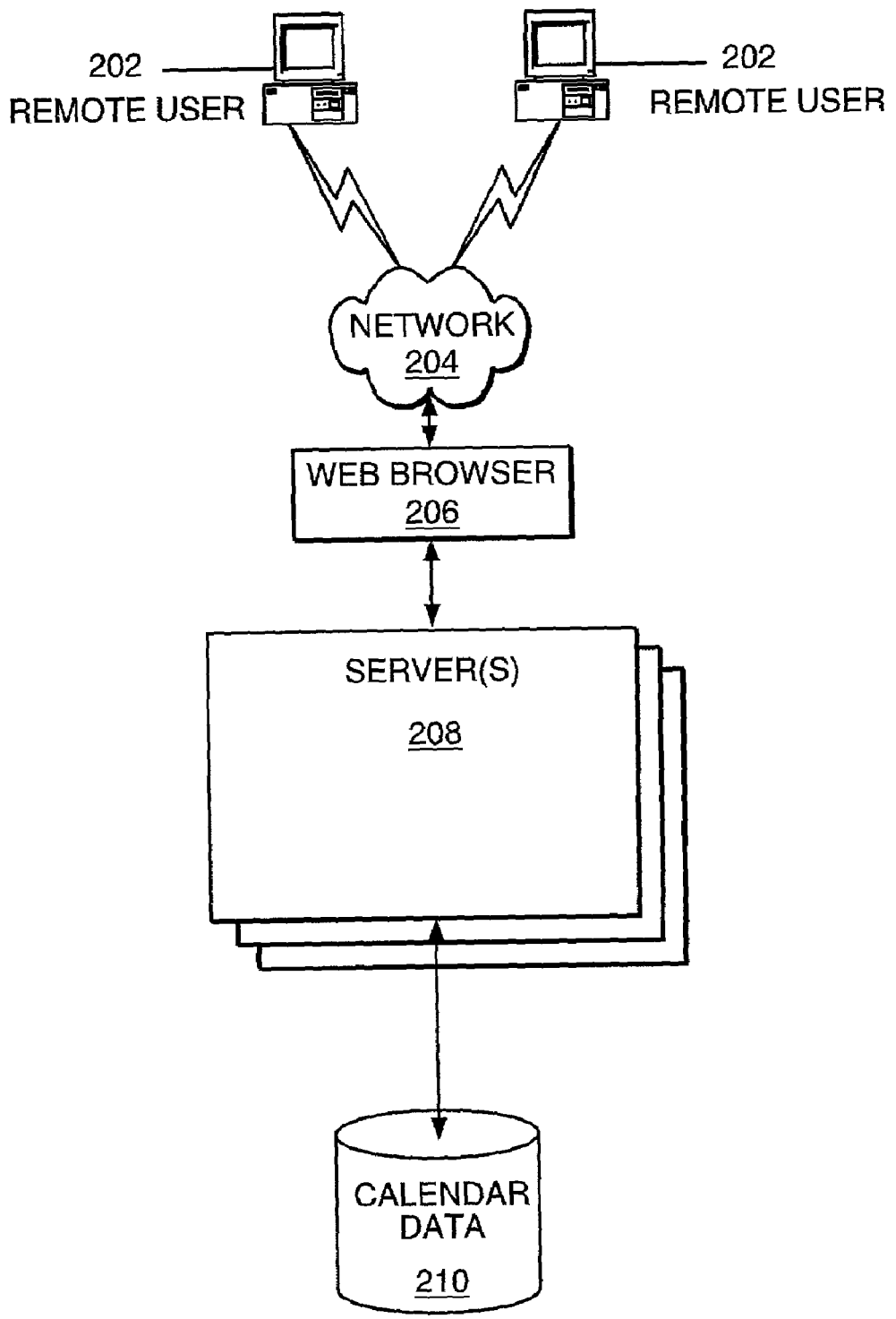
FIG. 2 shows a system for scheduling an event over a network in accordance with an embodiment of the invention.

FIG. 2 shows a system for scheduling an event over a network in accordance with an embodiment of the invention. A user may access the World Wide Web via a remote computer 202 that is in communication over a network 204 with a plurality of servers 208. The network 204 may be implemented as the Internet, in particular, the World Wide Web. Multiple users 202 may access and communicate over the system. The servers 208 are in communication with a database that stores, among other things, calendar and calendar data. The servers 208 may also be in communication with other databases that store the content for Web sites accessible on the World Wide Web. Accordingly, the user (or invitee) may access their calendar as well as other information via sites on the World Wide Web. An invitee may use a Web browser 206 to locate, display and interact with the information on the Web pages on the World Wide Web.

FIG. 3 shows an exemplary content site including a schedule link in accordance with an embodiment of the invention. In FIG. 3, a content site 302 is viewed by an invitee using a Web browser 308. The content site 302 includes a number of events the invitee may schedule in their calendar. Accordingly, the event creator has provided a link 304 associated with an event 306 so an invitee may schedule the event 306 in the invitee's calendar. The event creator may provide links for any of the events on the content site 302. To schedule the event, the invitee selects the link 304, which may appear as a graphical button as shown in FIG. 3. The link 304 creates a schedule request including a set of details for the event as well as an event identifier and an event creator identifier. The set of details includes the date, time, location, etc. for the event. Preferably, the schedule request is an HTTP request. An example HTTP schedule request is: <a href="http://www-.palm.net/scheduleEvent?name=family_picnic&time=200107041200EST&catgeory=jamesfamily&mypalmid=837293172">Schedule the James family picnic into your calendar!!</a></font> our picnic. In order to create a schedule request, the event details are parsed using parsing methods known in the art.

The schedule request is sent to a server associated with the invitee's calendar as well as a calendar for the event creator. In one embodiment, the calendar and calendar data are stored in a database 210 (shown in FIG. 2) in communication with the server. As discussed previously, the invitee's calendar and the event creator's calendar may be part of a personal information management system. The invitee advantageously continues to view the Web page 302 from which the event 306 was selected while the event is scheduled in the invitee's calendar.

Returning to FIG. 2, when the server 208 receives the schedule request, the server 208 will determine whether the user is logged in to the system, such as a PIM, associated with the invitee's calendar. If the Web browser 206 includes a information to login to the system and add the event to the invitee's calendar. If the Web browser 206 does not include a cookie with the invitee's login information, or if the invitee is not registered with the system, the invitee will be prompted to login and/or register with the system. The event creator identifier that is included in the schedule request is used to access the calendar and calendar data for the event creator.

Figure 5:
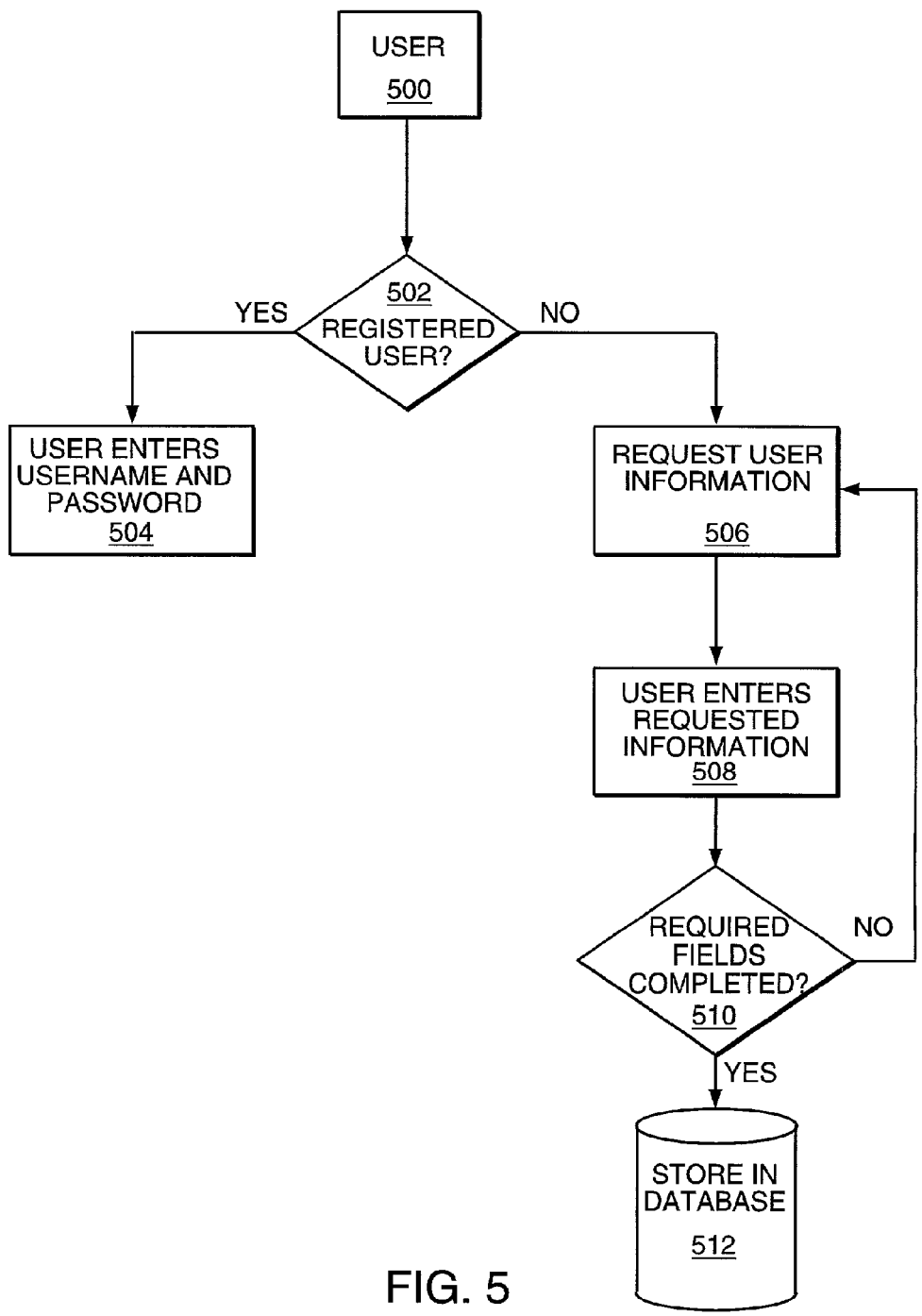
FIG. 5 shows the logical flow of a login and registration process in accordance with an embodiment of the invention.

FIG. 5 is a block diagram of the logical flow of a login and registration process in accordance with an embodiment of the invention. FIG. 5 illustrates the logical flow of a user registration process in accordance with an embodiment of the invention. At bock 500, the user is presented with a Web page requesting login or registration information. If the user is a registered user at block 502, then the user will enter their username and password at block 504 to login to the personal information management system. If the user is not a registered user at block 502, the system begins a user registration process at block 506 by requesting registration information from the user. At block 508, the user will provide information such as a name and e-mail address as well as a password and username chosen by the user. If all of the required fields as completed at block 510, then a user account including the information provided by the user is stored in the database at block 512. If the required information is not provided at block 510, then the user registration process will prompt the user for the required information again at block 506.

Figure 4:
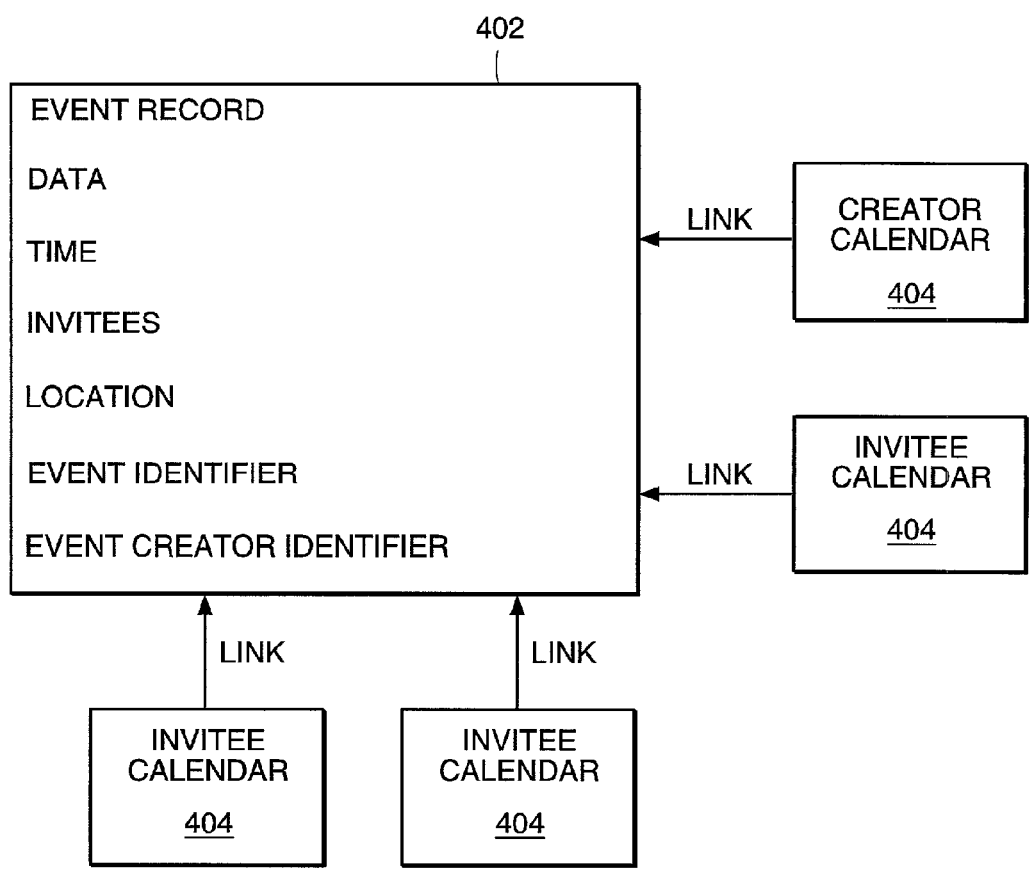
FIG. 4 is a block diagram of an event record in accordance with an embodiment of the invention.

Returning to FIG. 2, once the server accesses the invitee's calendar and calendar data, the event identifier and the event creator identifier may be used to determine if the event is new or has been scheduled before by another invitee. If the event is new (i.e., an event record does not exist), an event record is created for the event and stored at server 208, preferably in a database 210. FIG. 4 is a block diagram of an event record in accordance with an embodiment of the invention. The set of details for the event (e.g., time, location, etc.) are stored in the event record 402 as well as the event identifier and the event creator identifier. In addition, a link is created from the event record 402 to the event creator's calendar 404 and the invitee's calendar 404. Once the event record is created, each time an invitee schedules the event, a link will be created from the event record 402 to the particular invitee's calendar 404.

Figure 6:
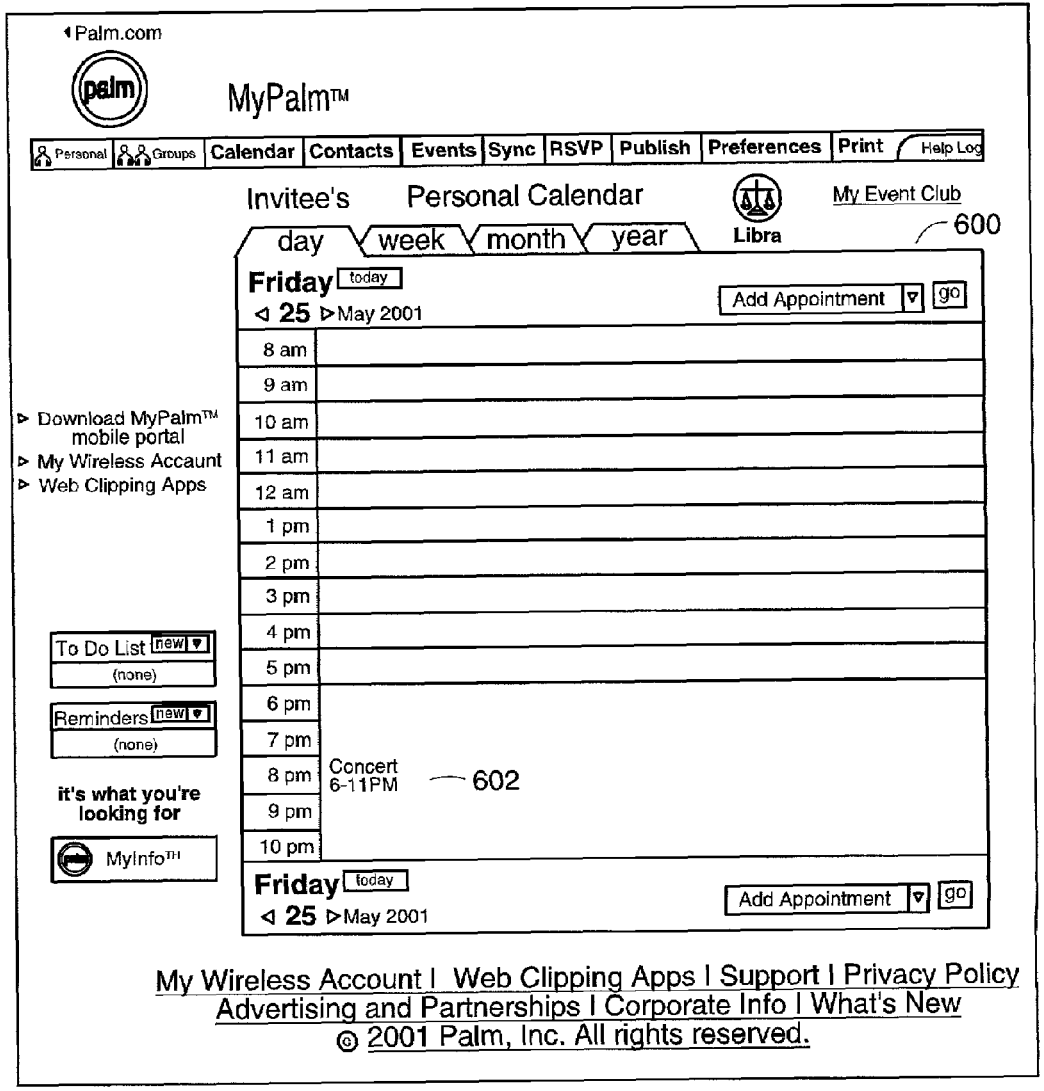
FIG. 6 shows an exemplary calendar view including an event in accordance with an embodiment of the invention.

A reference to the event is also added to the invitee's calendar that shows information such as the date, time location, etc. of the event. When the invitee accesses their calendar, they will be able to view the reference to the scheduled event 602 as shown in FIG. 6. FIG. 6 shows an exemplary calendar view 600 including a scheduled event 602 in accordance with an embodiment of the invention.

Returning to FIG. 4, if the event has been scheduled before, then an event record 402 should already exist for the event. The set of details in the schedule request are compared to the set of details stored in the event record 402 to determine if a change has been made. If a change has been made to the set of details for the event, the event record 402 will be updated as well as the calendar view of any invitee that had previously scheduled the event. As discussed above with respect to FIG. 2, changes made by the event creator to the event are advantageously automatically updated in each invitee's calendar via the link from the event record to each invitee's calendar.

Returning to FIG. 2, once the event has been added to the invitee's calendar, a response may be sent from the server to the Web browser used by the invitee to indicate that the event has been added. For example, a light may appear, or an additional window may appear to indicate a successful addition of the event.

In a further embodiment, an invitee may add the event to a handheld device such as a personal digital assistant (PDA). The invitee's calendar data stored in the database at the server may be added to calendar data on a PDA using synchronization methods known in the art. The PDA may synchronize with the calendar and contact data using a wired connection or through wireless communication for a wireless device.

Alternative embodiments of the invention may be implemented as a computer program product for use with a computer system. Such implementation may include a series of computer instructions fixed either on a tangible medium, such as a computer readable media (e.g., a diskette, CD-ROM, ROM or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques), the series of computer instructions preferably embodies all or part of the functionality described herein with respect to the system. Those skilled in the art should appreciate that such computer instructions can be written in a number of programming languages for use with may computer architectures or operating systems. Furthermore, such instructions may be stored in any memory device, such as a semiconductor, magnetic, optical or other memory devices, and may be transmitted using any communications technology, such as optical, infrared, microwave or other transmission technologies. It is expected such a computer program product may be distributed as a removable computer program product with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method for scheduling an event over a network in a calendar of an invitee, the event having a set of details including at least a predetermined time for the event provided by an event creator, the method comprising:

as the result of an invitee clicking on a link on a web page published on the Internet by the event creator for the event, wherein the clicking on the link by the invitee on the web page is not preceded by the sending to the invitee of an invitation about the event or the predetermined time for the event, receiving a schedule request at a server in communication with the network, the schedule request including at least the predetermined time for the event and an identifier for the event creator, wherein the server has access to the calendar of the invitee and a calendar for the event creator;

creating an event record at the server, the event record including at least the predetermined time for the event and a link to the calendar of the invitee;

adding the event to the invitee's calendar;

receiving a change to at least one member of the set of details for the event from the event creator;

updating the event in the invitee's calendar with the changed set of details using the link between the event record and the invitee's calendar; and sending a notification message to the invitee including the changed set of details.

2. A method according to claim 1, further including:
creating a link from the event record to the event creator's calendar; and
adding the event to the event creator's calendar.

3. A method according to claim 1, wherein the network is the Internet.

4. A method according to claim 2, wherein the invitee's calendar, the event creator's calendar and the event record are stored in a database in communication with the server.

5. A method according to claim 1, wherein the schedule request is a hypertext transfer protocol request.

6. A method according to claim 1, wherein the invitee's calendar is part of a personal information management system.

7. A method according to claim 1, wherein the action results from invoking a link by the invitee, the link associated with the event on the web page of the event creator.

8. A system for scheduling an event over a network in a calendar of an invitee, the event having a set of details provided by an event creator including at least a predetermined time for the event, the system comprising:

a first link, inserted in a web page published on the Internet and associated with the event creator and including the event, that when selected by the invitee creates a schedule request including at least the predetermined time for the event and an identifier for the event creator, the schedule request directing the event to the invitee's calendar, wherein the selection by the invitee of the first link is not preceded by the sending to the invitee of an invitation or other notice, other than the web page, about the event or the predetermined time for the event;

at least one server, in communication with the network, to receive the schedule request and store the event in the invitee's calendar and in an event record that includes a second link to the invitee's calendar; and at least one database, in communication with the server, to store the event record.

9. A system according to claim 8, wherein the schedule request is a hypertext transfer protocol request.

10. A system according to claim 8, wherein the event is stored in a calendar for the event creator.

11. A system according to claim 8, wherein the web page is a page on the World Wide Web.

12. A computer program product for scheduling an event over a network in a calendar of an invitee, the event having a set of details provided by an event creator including at least a predetermined time for the event, the computer program product comprising a tangible storage medium having computer readable code thereon, the computer readable program code including:

program code for receiving a schedule request, the schedule request including at least the predetermined time for the event and an identifier for the event creator, as the result of the invitee clicking on a link on a web page published on the Internet by the event creator for the event, at a server in communication with the network, wherein the server has access to the calendar of the invitee and a calendar for the event creator, and wherein the clicking on the link on the web page is not preceded by the sending to the invitee of an invitation about the event or the predetermined time for the event;

program code for creating an event record at the server, the event record including at least the predetermined time for the event and a link to the calendar of the invitee; and program code for adding the event to the invitee's calendar.

13. A computer program product according to claim 12, wherein the schedule request is a hypertext transfer protocol request.

14. A computer program product according to claim 12, further including:

program code for creating a link from the event record to the event creator's calendar; and program code for adding the event to the event creator's calendar.

15. A computer program product according to claim 12, wherein the event creator changes at least one member of the set of details, the computer program product further including:

program code for updating the event record with the changed set of details; and program code for updating the event in the invitee's calendar with the changed set of details using the link between the event record and the invitee's calendar.

16. A computer program product according to claim 15, further including program code for sending a notification message to the invitee including the changed set of details.

\* \* \* \* \*

UNITED STATES PATENT AND TRADEMARK OFFICE
CERTIFICATE OF CORRECTION

PATENT NO. : 7,668,900 B2  Page 1 of 1
APPLICATION NO. : 09/872164
DATED : February 23, 2010
INVENTOR(S) : Daniel Fishman et al.

It is certified that error appears in the above-identified patent and that said Letters Patent is hereby corrected as shown below:

Title Page, Item (75) Inventors, "Jorges Sanchez" should correctly read --Jorges Sanchez de Lozda--.

Title Page, (*) Notice: Subject to any disclaimer, the term of this patent is extended or adjusted under 35 U.S.C. 154(b) by 887 days.

should read (*) Notice: Subject to any disclaimer, the term of this patent is extended or adjusted under 35 U.S.C. 154(b) by 1,556 days.

Signed and Sealed this

Eighth Day of June, 2010

David J. Kappos
*Director of the United States Patent and Trademark Office*